Sept. 20, 1960 W. H. COATES 2,953,218
SEPARATION OF METALLIC HALIDES
Filed Oct. 19, 1956
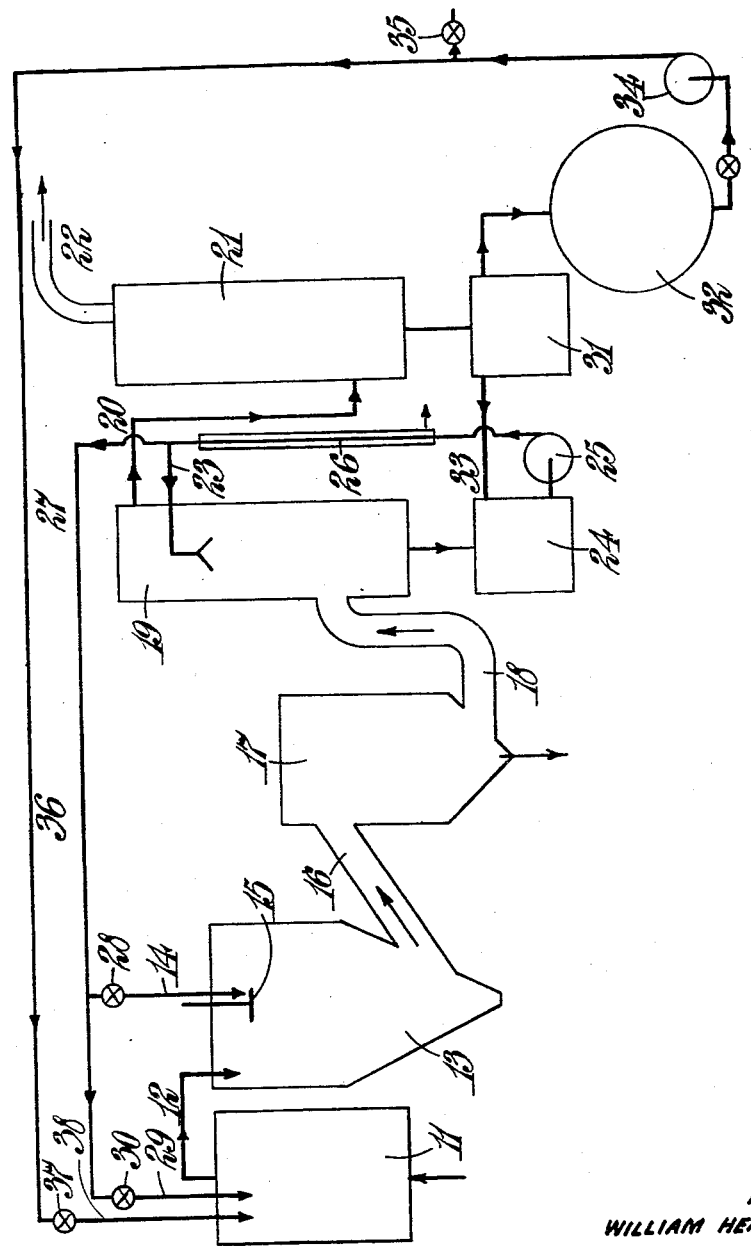
INVENTOR
WILLIAM HENRY COATES
Oscar L. Spencer
ATTORNEY _United States Patent Office_

2,953,218
Patented Sept. 20, 1960

2,953,218

SEPARATION OF METALLIC HALIDES

William Henry Coates, Stockton-on-Tees, England, assignor to British Titan Products Company Limited, Billingham, England, a British company Filed Oct. 19, 1956, Ser. No. 617,184

Claims priority, application Great Britain Oct. 25, 1955

12 Claims. (Cl. 183—120)

This invention relates to the production and recovery within the system in dry state of substantially all the associated iron chloride formed during the manufacture of titanium chloride from a titaniferous ore.

Many processes have been devised for the manufacture of titanium chloride from rich titanium ores (such as mineral rutile), from titanium ores in which iron is a substantial constituent (e.g. ilmenite) and from titanium ores in which iron is a minor constituent but yet an important impurity to be removed. In such processes the ore is chlorinated in a furnace e.g. a shaft furnace and carbon or other reducing agent may be present. In these prior processes, except those in which the iron constituent is preferentially removed before the titanium, a mixed vapour containing iron chlorides and titanium chloride is produced.

It would normally seem a comparatively simple operation to condense the iron chlorides from the chlorination gases by a controlled method of cooling whereby the iron chlorides substantially all condense above the dew point of the titanium chloride constituent. Whilst many processes have been devised for this purpose it has usually been found in practice that on cooling the gases to temperatures in the range 120° to 170° C., whereas substantially all the iron chloride is precipitated, only a proportion is deposited in the cooler or subsequent cyclones, the remainder being in such a finely divided state that it forms a dispersion of solids in the gases (which may be referred to as an aerosol) in which form it is very difficult to separate and collect. Cyclones, electrostatic precipitators, liquid washing and filtration have all been employed in attempts to overcome this difficulty. Of these methods, the process of washing the gases, either in a packed tower or by spraying with titanium chloride, has been preferred. A similar result has also been obtained by allowing the dispersion to pass on to the titanium chloride condensation plant where the ferric chloride is removed as a suspension in the liquid titanium chloride therein produced. Either of these methods still requires the additional step of separation which usually involves separate plant and special precautions which are elaborate and expensive.

In the systems described, the hot gases have emerged from the chlorinator at temperatures of approximately 700° to 1100° C. and various cooling devices have been employed. Such devices have been either indirect or direct. Of the latter spraying with cold liquids such as titanium chloride, the recirculation of cool inert gases (particularly those from the latter stages of the condensation), as well as admission of either inert solids or solids such as ferric chloride which are volatile under the temperature conditions obtaining, have been described.

According to the present invention there is provided a method for the separation within the system of all the iron chloride in dry form from gases derived from the chlorination of titaniferous materials which method comprises passing the gases successively through a primary cooling chamber cooled by the admission of an atomised titanium chloride suspension, a settling chamber where a portion of the iron chloride condensed in the cooling chamber is separated, and a washing tower irrigated with a recirculated countercurrent stream of titanium chloride suspension, the resulting suspension of iron chloride in liquid titanium chloride being recycled to the chlorinator and/or to the primary cooling chamber in order to deposit all the iron chloride in the primary cooling chamber and the settling chamber in dry solid form.

The gases resulting from the chlorination of the titaniferous materials consist predominantly of titanium tetrachloride and iron chloride together, it may be, with smaller amounts of the chlorides of zirconium, aluminium, vanadium, niobium, tantalum, chromium, silicon and tin.

The term titanium chloride suspension is used herein to denote liquid titanium chloride with iron chloride (with or without other solid chlorides) suspended or dissolved therein.

The term "iron chloride" is used in this specification to refer to ferric or ferrous chlorides or any other volatile chlorides such for example as zirconium chloride or aluminium chloride which may be condensed to solid under the conditions set out hereunder.

Titanium chloride vapour, which may have associated with it other normally liquid chlorides, e.g., vapours of silicon and tin chloride, emerges from the top of the washing tower substantially free from solid constituents.

The concentration of iron chloride in the titanium chloride suspension may be adjusted from 1 to 30% by weight iron chloride.

The hot chlorination gases are cooled in the primary cooling chamber by the atomised titanium chloride suspension to a temperature 30° to 70° C. above the dew point of the titanium chloride constituent. The hot chlorination gases at the same time also effect the spray evaporation of the titanium tetrachloride liquid and spray drying of the iron chloride constituents of the titanium chloride suspension admitted to the primary cooling chamber. The temperature of the titanium chloride suspension admitted to the washing tower is controlled to limit the condensation of titanium chloride therein to such an extent that the quantity of suspension to be recycled to the chlorinator and/or to the primary cooling chamber is not greater than the total required to control the temperature of the bed in the chlorinator and to cool the hot chlorination gases in such a way that substantially the whole of the liquid constituent is evaporated.

The iron and other metal chlorides which condense to the solid state above the dew point of the titanium chloride constituent may be recirculated within the cyclic system a number of times until in a dry form in which they are deposited within the primary cooling chamber or the succeeding cyclone separator.

Titanium chloride substantially purified in the manner of the present invention from other constituents of hot chlorination gases may be obtained and condensed by conventional methods, e.g., by indirect cooling in one or more stages to temperatures between approximately 0° C. and —20° C.

The invention is particularly applicable to fluidised bed processes in which the raw material may consist of titanium oxide bearing bodies such for example as mineral rutile, ilmenite and slags. These raw materials are usually admixed with a carbonaceous reducing agent continuously or intermittently fed into the reaction chamber where they are contacted with the reactive chlorine gases.

Initially the mixture of solid raw material is raised to reaction temperatures of 700° to 1100° C. (preferably 850° to 950° C.) by preheating in any well known manner.

The gases resulting from chlorination contain titanium chloride, iron chloride and, chlorides of other elements present in the ore, particularly chlorides of chromium, zirconium, vanadium, aluminum, manganese, magnesium, tantalum, niobium and silicon. If the temperatures are adequately controlled in order not to exceed e.g. 950° C., the proportion of, for instance, zirconium chloride may be relatively low. The silicon content may also be considerably reduced but this will depend on the form in which it occurs in the ore. In addition to the chlorides present in the gas there may be found small quantities of excess chlorine and hydrochloric acid, the latter dependent on the hydrogen constituents present in the reaction chamber. In addition there will be oxides of carbon preferably with a higher proportion of carbon dioxide to carbon monoxide and, in this process, for efficient working, a ratio of 3 : 1 is usually obtained. Other inert gases, according to the products admitted to the furnace and, particularly the purity of the chlorine, may also be present. In addition to the above gases the stream will have in suspension, by entrainment, the fine particles of ash or residue from the ore and carbonaceous matter resulting from the solid carbon reducing agent.

The gases having a temperature of approximately 900° C. are fed to a primary cooling chamber in which they are sprayed or otherwise mixed with atomised liquid particles of titanium chloride suspension re-cycled from later stages in the plant. The essential feature of such admission is that the whole of the liquid constituent is evaporated within the chamber. In this way the gases are cooled from 900° C. to a temperature 30° to 70° C. above the dew point of the titanium chloride constituent.

The iron chloride precipitated in the primary cooling chamber is usually in a finely divided state and where aggregated is frequently in a flaky condition and does not readily settle and is therefore not easily removable by such well known methods as cyclone separation. However, by passing these gases through a cyclone system it is possible to remove about 70% of the iron chloride precipitated, the remainder being in an aerosol condition which requires either longer time or preferably other treatment for its removal.

The gas stream leaving the cyclone system is allowed to enter the lower part of a washing tower, packed if desired with rings or other suitable packing, and having if necessary a distributor or spray device at the top so that the gases entering the tower near the bottom are washed with a counter-current stream of titanium chloride suspension. In this way the iron chloride or other solid chlorides suspended in the gas stream in finely divided condition is removed therefrom so that the gases leaving the column are substantially free from solid.

The titanium chloride suspension, used for washing the gases in the washing tower is circulated at a temperature which will control the extent of condensation of the titanium chloride from the gas stream. Thus, by raising the temperature of the circulating liquid, the condensation of titanium chloride will be reduced, and in consequence, the iron chloride concentration will be increased and vise versa. In practice, the titanium chloride suspension is admitted at relatively high temperature, i.e., from 75° to 130° C. (preferably 90° to 110° C.). The liquid suspension fed to the tower removes the finely divided iron chloride from the gas stream and conveys the resulting suspension of iron chloride to a tank located below the tower. Thence, the suspension is re-circulated by pump, part back to the top of the washing tower and part to the primary cooling chamber for cooling the hot gases derived from the chlorinator. In this way, the whole of the iron chloride constituent removed from the gas stream in the washing tower is ultimately recycled to the primary cooler where the titanium chloride is re-evaporated.

Additionally when operating large scale chlorination plants, i.e., fluid bed chlorinators of diameters greater than 18 inches, to maintain a suitable output it may be found desirable to cool the bed and titanium chloride or a slurry of iron chloride in titanium chloride has been found suitable for this.

From the washing tower, the gases may be conveyed to a series of condensers which may be directly or indirectly cooled, for recovery of a substantially iron free titanium chloride constituent. The gases enter the condensing system at temperatures of approximately 100° to 125° C. and are progressively cooled down to from −10° C. to −20° C. at which point they are discharged to atmosphere after undergoing suitable treatment for the removal of residual constituents such as titanium chloride, hydrochloric acid, or chlorine.

It will be seen that any iron chloride or other condensable solid material condensed from the hot chlorination gases which is not deposited before entering the washing tower will be removed by washing therein and recycled, until it is ultimately collected in the primary cooler or the cyclone in a dry condition substantially free from titanium chloride and other more volatile constituents.

The quantity of recycled titanium chloride suspension required for cooling the hot chlorination gases will depend on the temperature from, and to which the chlorination gases are to be cooled. It follows, therefore, that there should be preferably available from the washing tower a quantity of titanium chloride suspension sufficient for the primary cooling of the gases. Although it is possible to utilise a suspension with a high solid content, it is obviously desirable to work with suspensions with as low a solids concentration as possible, and for this reason the process is designed so as to enable the solids collected in the washing tower to be recycled back to the spray cooling stage in the maximum amount of liquid.

By the method of this invention it has been found that the amount of titanium chloride suspension available for re-use in the primary cooling operation or in the chlorinator can be controlled by adjustment of the temperature of the titanium chloride suspension in the washing tower. Whilst the ideal condition would be to produce the exact amount of condensate required within the washing tower, in practice it is found desirable to produce a condensate somewhat less than required, that is by working at a temperature slightly higher than would give the required amount of condensate. This is a practical safeguard which enables a simple method of operation. The deficiency of condensate obtained by this method is made up by supplying a relatively small amount of titanium chloride condensate from the subsequent stage in such a way that a constant level is maintained in the tank below the washing tower from and to which the titanium chloride washing mixture is re-circulated.

It will be seen that the amount of iron chloride in the washing tower mixture may vary considerably according to, for example:

(a) The amount of iron chloride vapour generated in the chlorinator, (b) The proportion of iron chloride which is precipitated in the primary cooler or settling chamber, and (c) The quantity of condensate required by the primary hot chlorination gas cooler and the chlorinator.

The concentration of iron chloride within the washing tower system may thus vary up to 30% calculated as ferric chloride. Normally it will be found that it is unnecessary to employ concentrations as high as this.

The atomisation of the titanium chloride suspension in the primary cooling chamber may be accomplished by use of high pressure jets or by the so called "two fluid jets" in which the conveying second fluid could be superheated titanium chloride vapour. The preferred method, however, is the centrifugal method using an atomising wheel with high speeds of the order of 4000 to 15000 r.p.m. By this means uniform and very fine droplets are obtained which are easily volatilised even when the drying gas into which they are admitted is not more than 20° to 30° C. above the dew point of the titanium chloride in the issuing gas.

The process may be more particularly understood by the following description and with reference to the accompanying diagrammatic drawing:

In the drawing, 11 represents a chlorinator from which the gases emerge through conduit 12 and enter at approximately 900° C. a primary cooler 13 in which they are admixed with finely divided or atomised titanium chloride suspension admitted via conduit 14 through spray device 15. The gases are thereby cooled to around 165° C. and leave the primary cooler 13 passing via conduit 16 to the cyclone 17. It will be noted that iron chloride will be deposited in the cooler 13 and the cyclone 17. The gases leaving 17 pass via a conduit 18 at a temperature of about 150° C. and enter towards the bottom of a washing tower 19. The gases pass upward through the tower 19 and be discharged therefrom through conduit 20 to an indirect condenser 21 wherein they will be progressively cooled to a temperature of about −15° C. The uncondensed gases emerging via 22 after passing through suitable purification devices are discharged to atmosphere. Entering the washing tower 19 through conduit 23 is warm titanium chloride suspension maintained at a temperature varying from 80° to 110° C. to contact by a spray device or by contact through rings packed in the tower, the chlorination gases entering via conduit 18 and containing iron chloride in finely divided state. The iron chloride removed from the gases is carried down as a suspension into a tank 24 from which it is re-circulated via pump 25 and a water jacketed conduit 26 and thereafter part through conduit 23 to the washing tower 19 and part through conduit 27 leading back into either or both of conduits 14 via valve 28 to the primary cooler or conduit 29 via valve 30 to the chlorinator.

The condensate produced in the indirect condenser 21 passes into tank 31 and thence into a storage container 32 for further purification, if necessary. From the tank 31 some of the condensate can pass back through conduit 33 to a constant head device which maintains the level in tank 24. Thus, any deficiency in the amount of condensate produced during the washing operation in 19 is compensated by condensate flowing from tank 31 via conduit 33 to tank 24.

From the storage container 32 the condensate via pump 34 is withdrawn via outlet 35 or may be re-cycled via conduit 36 through valve 37 and conduit 38 to the chlorinator 11.

Following is a description by way of example and with reference to the accompanying drawing of methods of carrying the invention into effect.

*Example I*

To a continuous fluid bed chlorinator was added mineral rutile containing 97% $TiO_2$, 1% Fe, 0.2% V, at the rate of 9100 kilos/day. At the same time coke was added at the rate of 1550 kilos/day. The bed was fluidised by chlorine fed at the rate of 15000 kilos/day. The hot chlorination gases emerged from the chlorinator into the primary cooler at the rate of 25,400 kilos/day at a temperature of 900° C. These gases were therein cooled by a titanium chloride slurry at the rate of 30000 kilos/day of liquid titanium chloride containing 350 kilos of iron chloride in suspension. The slurry was fed on to a high speed atomising wheel operating at 14000 r.p.m. and, in this way, the slurry was admitted to the hot chlorination gas stream in the form of very fine droplets easily vapourisable. The hot chlorination gas mixture was thereby cooled to a temperature of 165° C.

The resulting cooled gas stream was led from the primary cooler 13 to cyclone 17 wherein was deposited 265 kilos per day of iron chloride, 50 kilos of coke dust and 180 kilos of unreacted $TiO_2$. The gases discharged from the cyclone at a temperature of 150° C. entered via conduit 18 the washing tower 19 packed with Raschig rings (6 inches diameter at the bottom graded through 4 inch to 2 inch rings at the top of the column) and were scrubbed therein by a titanium chloride slurry maintained at 110° C. re-cycled from the tank 24 at the rate rings (6 inches diameter at the bottom graded through 4 gaseous suspension were transferred to the circulating slurry. Part of the circulating slurry was continuously drawn from the conduit 23 via conduits 27 and 14 for re-use in the primary cooler, as already described, at the rate of 30,000 kilos titanium chloride per day.

The gases freed from their solid content emerging from the washing tower were led via the conduit 20 to an indirect condenser 21 where they were cooled to −15° C. to condense the liquid titanium chloride and the gases after further treatment for noxious fumes including about 200 kilos/day titanium chloride were discharged to atmosphere. The titanium chloride condensed in 21 was collected in 31 from which a small quantity, 2000 kilos/day, was returned to tank 24 to maintain the required amount of titanium chloride in circulation through the washing tower. The greater part of the condensate in 31, i.e. 20,500 kilos/day was conveyed to a storage reservoir 32. This condensate of titanium chloride had an iron content of 0.002%.

*Example II*

To a preheated chlorinator similar to that in Example I, except that the construction gave a higher degree of insulation, mineral rutile and coke generally, as described therein, and chlorine were fed at similar rates. In this operation, however, there was a rise in temperature during the chlorination and this was controlled by the continuous addition of a slurry of iron chloride in titanium tetrachloride which was fed into the fluidised bed at the rate of 5000 kilos of titanium tetrachloride containing 60 kilos of ferric chloride per day. The gases emerging from the furnace were cooled in the primary cooler by a titanium chloride slurry fed at the rate of 25,000 kilos titanium tetrachloride containing 290 kilos of ferric chloride per day. In this way, either from the cooler or the subsequent cyclone, ferric chloride was discharged at the rate of 265 kilos per day together with 230 kilos of dust arising from the chlorinator, i.e., the dust being a mixture of very finely divided residue of unattacked rutile and unattacked coke. The gases emerging from this system had a temperature of 150° C. and contained 50,700 kilos of titanium tetrachloride and 350 kilos of ferric chloride per day. These gases were introduced into a scrubbing tower through which a titanium tetrachloride slurry was circulated at a temperature of 110° C. at the rate of 400,000 kilos per day. In this way, the iron chlorides in the gaseous suspension were transferred to the circulating slurry and thus removed from the gases without substantial evaporation or condensation of the titanium tetrachloride constituent fed into the scrubber in a gas stream from the chlorinator. Thus, emerging from the scrubber was obtained the gas stream substantially free from iron chloride amounting to 50,700 kilos per day of titanium tetrachloride. From this the titanium tetrachloride was condensed by cooling to −15° C. and leaving the condenser system was a mixture of mainly carbon gases containing a residue of titanium tetrachloride vapour amounting to 200 kilos per day which was treated for obnoxious gases by passing through a tower through which alkali was circulated and the remaining gases were discharged to atmosphere. The condensate of titanium tetrachloride passing out of the condenser system was in part, i.e. to the extent of 20,500 kilos per day, withdrawn for storage and external use. The remaining 30,000 kilos per day were returned to the base of the scrubbing tower for use in scrubbing of the gases proceeding from the chlorinator and for recirculation within the system as previously described to either the primary cooler or to the chlorinator. In this way, the iron chloride produced in the chlorinator was ultimately recovered either in the primary cooler or the subsequent cyclone as a dry dust substantially free from titanium tetrachloride and contaminated only with residual dust of rutile and carbon transported from the chlorinator. By means of this system therefore there were no residues of iron chloride in the succeeding plant which required separate treatment. The titanium tetrachloride condensed was essentially a clear slightly straw yellow liquid with an iron content of 0.0015% calculated as Fe on the titanium tetrachloride.

Although the present invention has been described with reference to specific details of certain embodiments thereof, it is not intended that such details shall be regarded as limitations upon the scope of the invention except to the extent included in the accompanying claims.

I claim:

1. The process of recovering iron chloride from a mixture of vapors of iron chloride and titanium tetrachloride produced by chlorinating an iron-titanium bearing material which comprises contacting in a primary condensing zone the vapors with liquid titanium tetrachloride and solid iron chloride to cool the mixture to a temperature at which iron chloride condenses but titanium tetrachloride is in vapor state and thereby causing conversion of iron chloride vapor to solid iron chloride, removing a portion of the solid iron chloride from the resulting vapors, scrubbing the remaining vapor-iron chloride mixture with liquid titanium tetrachloride, returning iron chloride thus scrubbed out of suspension together with liquid titanium tetrachloride to the primary condensing zone and thereby cooling further iron chloride-titanium tetrachloride vapor to a temperature at which iron chloride condenses but titanium tetrachloride remains in vapor state and thereby condensing further iron chloride.

2. A method as claimed in claim 1 wherein the proportion of solid iron chloride to liquid titanium tetrachloride contacted with the vapors in the primary condensing zone is adjusted from 1 to 30% by weight iron chloride.

3. A method as claimed in claim 1 wherein the hot chlorination gases are cooled in the primary condensing zone to a temperature 30° to 70° C. above the dew point of the titanium chloride constituent.

4. A method of separating iron chloride from a vapor mixture comprising iron chloride vapor and titanium tetrachloride vapor which comprises contacting the mixture with sufficient liquid suspension of solid iron chloride in liquid titanium tetrachloride to cool the vapors and condense iron chloride in solid state and to vaporize substantially all of the liquid titanium tetrachloride in said liquid suspension thereby producing a vapor suspension of solid iron chloride in titanium tetrachloride vapor, removing only a portion of the solid iron chloride from the vapor suspension, washing the residual iron chloride from the vapor suspension with liquid titanium tetrachloride and thereby increasing the solid iron chloride content in said liquid titanium tetrachloride and also providing titanium tetrachloride vapor which has been substantially freed from iron chloride, separating the titanium tetrachloride vapor from the second liquid suspension, condensing titanium tetrachloride from the vapor thus separated, and recycling the liquid suspension of solid iron chloride to cool further portions of a vapor mixture comprising iron chloride vapor and titanium tetrachloride vapor.

5. The process of recovering iron chloride from a mixture of vapors of iron chloride and titanium tetrachloride produced by chlorinating an iron-titanium bearing material which comprises contacting in a primary condensing zone the vapors with liquid titanium tetrachloride and solid iron chloride to cool the mixture to a temperature at which iron chloride condenses, but titanium tetrachloride is in a vapor state thereby causing conversion of iron chloride vapor to solid iron chloride and producing a suspension of solid iron chloride and titanium tetrachloride vapor, separating a portion of said solid from the suspension leaving an aerosol of the vapor, scrubbing the aerosol with liquid titanium tetrachloride and recovering from the zone of scrubbing a liquid mixture of the aerosol and thereby producing a liquid mixture of the liquid titanium tetrachloride and the solid iron chloride of the aerosol and returning a portion of the liquid mixture to the primary condensing zone and thereby cooling further iron chloride-titanium tetrachloride vapor to a temperature at which iron chloride condenses but titanium tetrachloride is in vapor state and thereby condensing further iron chloride.

6. A continuous process for separating iron chloride in apparently dry particulate form from a hot crude iron chloride-titanium tetrachloride gaseous mixture which comprises cooling said hot gaseous mixture at least chiefly by direct contact with recycled iron chloride-titanium tetrachloride slurry to condense substantially all of the iron chloride in said gaseous mixture in the form of apparently dry particles and at the same time drying the iron chloride particles in said slurry to substantially the same form; settling out a substantial proportion but not substantially all of said condensed and said dried particles from said gaseous mixture; separately scrubbing the gaseous mixture with sufficient liquid titanium tetrachloride to wash substantially all of the residual iron chloride particles from said gaseous mixture in the form of a pumpable slurry; and recycling said slurry to said hot gaseous mixture.

7. A process according to claim 6 wherein the hot gaseous mixture is cooled solely by direct contact with recycled iron chloride-titanium tetrachloride slurry.

8. A continuous process for separating iron chloride from hot vapor comprising iron chloride and titanium tetrachloride in vapor state which comprises cooling the vapor with a liquid mixture of solid iron chloride and liquid titanium tetrachloride to condense iron chloride while maintaining titanium tetrachloride in vapor state and simultaneously drying the iron chloride in said liquid mixture thereby producing a gaseous mixture of titanium tetrachloride vapor and solid iron chloride, removing a portion but not all of the solid iron chloride from the mixture, separately scrubbing solid iron chloride from the remaining gaseous mixture with liquid titanium tetrachloride and thereby forming a liquid mixture of liquid titanium tetrachloride and solid iron chloride, and recycling the liquid mixture to the hot vapor.

9. A continuous process for separating iron chloride in apparently dry particulate form from a hot crude iron chloride-titanium tetrachloride gaseous mixture which comprises cooling said hot gaseous mixture at least chiefly by direct contact with recycled iron chloride-titanium tetrachloride slurry to condense substantially all of the iron chloride in said gaseous mixture in the form of apparently dry particles and at the same time drying the iron chloride particles in said slurry to substantially the same form; settling out a substantial proportion but not substantially all of said condensed and said dried particles from said gaseous mixture; separately scrubbing the gaseous mixture with liquid titanium tetrachloride to wash residual iron chloride particles from said gaseous mixture in the form of a pumpable slurry; and recycling said slurry to said hot gaseous mixture.

10. A process for separating iron chloride from a gaseous mixture of iron chloride and titanium tetrachloride which comprises cooling the gaseous mixture in a primary cooling zone with a solid iron chloride and liquid titanium tetrachloride to a temperature at which the iron chloride condenses to solid state but titanium tetrachloride in the mixture is in vapor state, removing a portion but not all of the condensed iron chloride from the resulting mixture, washing a further portion of said condensed iron chloride from the resulting gaseous mixture with liquid titanium tetrachloride, and returning the iron chloride thus washed from the mixture and liquid titanium tetrachloride to the primary cooling zone.

11. The process of claim 10 wherein the liquid titanium tetrachloride introduced into the primary cooling zone is vaporized and the portion of iron chloride is removed from the resulting mixture, leaving a suspension of fine, difficulty removable iron chloride particles suspended in the vapor.

12. The process of claim 10 wherein the liquid titanium tetrachloride and iron chloride returned to the primary cooling zone is a liquid mixture of titanium tetrachloride and iron chloride containing 1 to 30 percent by weight iron chloride.

References Cited in the file of this patent

UNITED STATES PATENTS

| | | |
|---|---|---|
| 2,245,358 | Pechukas | June 10, 1941 |
| 2,311,466 | Pechukas | Feb. 16, 1943 |
| 2,425,504 | Belchetz | Aug. 12, 1947 |
| 2,446,181 | Kraus | Aug. 3, 1948 |
| 2,533,021 | Krchma | Dec. 5, 1950 |
| 2,675,889 | Frey | Apr. 20, 1954 |
| 2,675,891 | Frey | Apr. 20, 1954 |
| 2,718,279 | Kraus | Sept. 20, 1955 |
| 2,784,058 | Hair | Mar. 5, 1957 |

FOREIGN PATENTS

| | | |
|---|---|---|
| 679,537 | Great Britain | Sept. 17, 1952 |

UNITED STATES PATENT OFFICE
CERTIFICATE OF CORRECTION

Patent No. 2,953,218                  September 20, 1960

William Henry Coates

It is hereby certified that error appears in the above numbered patent requiring correction and that the said Letters Patent should read as corrected below.

Column 6, line 8, for "rings (6 inches diameter at the bottom graded through 4" read -- of 400,000 kilos/day. In this way, the iron chlorides in --.

Signed and sealed this 24th day of October 1961.

(SEAL)
Attest:

ERNEST W. SWIDER                                          DAVID L. LADD
Attesting Officer                                         Commissioner of Patents

USCOMM-DC